No. 12,586. REISSUED DEC. 25, 1906.

L. SHELL.

CEMENT PIPE MOLD.

APPLICATION FILED APR. 27, 1906.

2 SHEETS—SHEET 1.

WITNESSES

M. McInnis

C. G. Hanson

INVENTOR

LEVI SHELL

BY Paul & Paul

HIS ATTORNEYS

No. 12,586. REISSUED DEC. 25, 1906

L. SHELL.

CEMENT PIPE MOLD.

APPLICATION FILED APR. 27, 1906.

2 SHEETS—SHEET 2.

WITNESSES.
M. McInnis
C. E. Branson.

INVENTOR
LEVI SHELL
BY
Paul & Paul
HIS ATTORNEYS

UNITED STATES PATENT OFFICE.

LEVI SHELL, OF SIBLEY, IOWA

CEMENT-PIPE MOLD.

No. 12,586. Specification of Reissued Letters Patent. Reissued Dec. 25, 1906.

Original No. 778,907, dated January 3, 1905. Application for reissue filed April 27, 1906. Serial No. 314,099.

*To all whom it may concern:*

Be it known that I, LEVI SHELL, of Sibley, county of Osceola and State of Iowa, have invented a new and useful Improvement in Cement-Pipe Molds, of which the following is a specification.

This invention relates to molds for manufacturing cement pipe of various sizes and forms, and has for its object to improve the construction and expedite the operation of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 2:
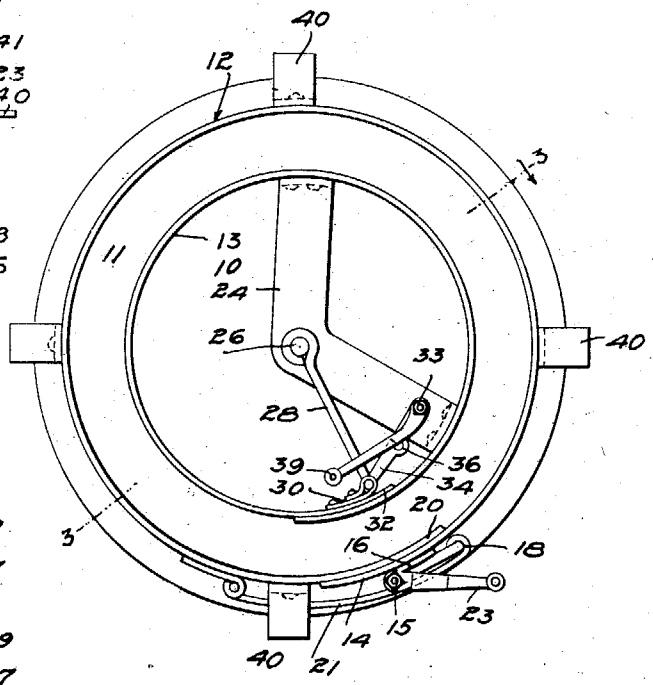
Figure 1:
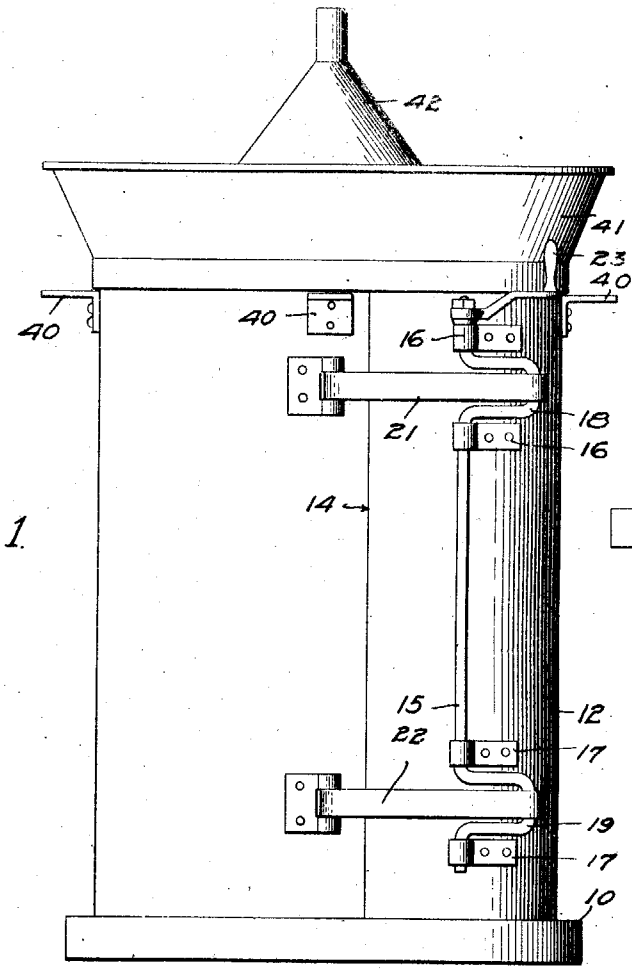
Figure 4:
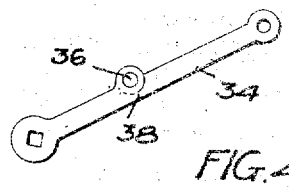
Figure 3:
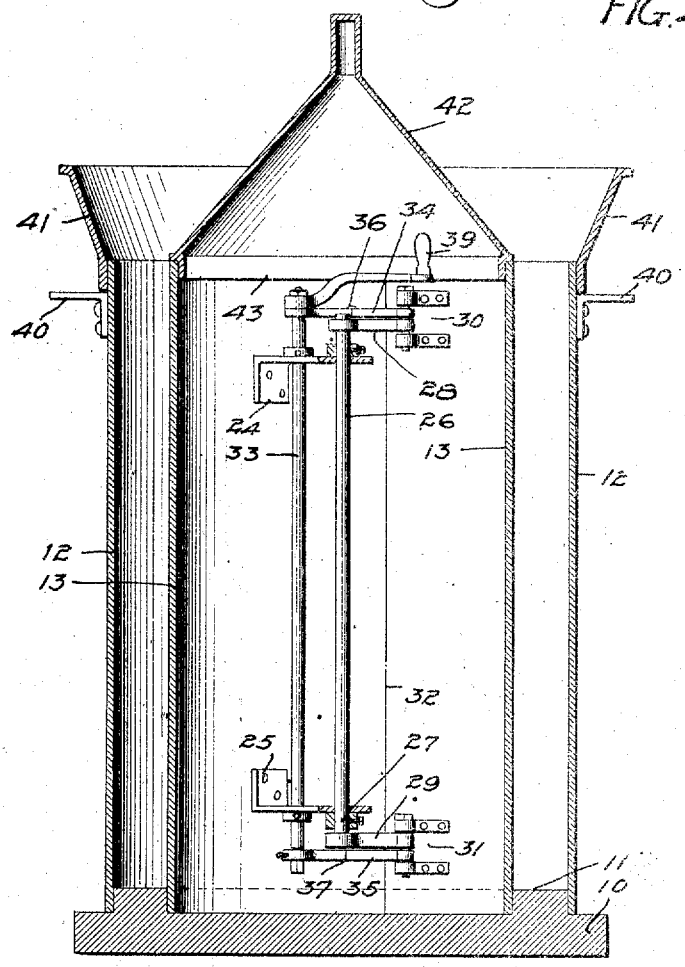

In the drawings thus employed, Figure 1 is a side elevation of the improved device. Fig. 2 is a plan view with the cement-guiding means detached. Fig. 3 is a vertical section on the line 3 3 of Fig. 2. Fig. 4 is an enlarged detail view of one of the jointed expanding and contracting bars of the inner shell of the improved device.

The improved device comprises a base member 10, having an annular rib 11, conforming to the thickness of the pipe to be molded.

The body of the mold comprises an outer shell or casing 12 and an inner casing or shell 13, each formed of a single metal plate of suitable thickness and resiliency and overlapping, respectively, at one side. The outer casing or shell 12 is provided near its overlapping end 14 with a vertical shaft 15, mounted for rotation thereon, as by clips 16 17, said shaft being provided with spaced cranks 18 19, the latter being pivotally connected to the underlapping end 20 of the outer shell by rods 21 and 22 and the shaft provided with an operating-handle 23. By this arrangement it will be obvious that when the handle is moved to the position shown in Figs. 1 and 2 the outer shell 12 will be contracted and compressed tightly around the rim 11 of the base 10 and form the outer wall of the mold, and when the position of the shaft 15 is reversed by throwing the handle member to the opposite position the resilient member 12 will be expanded, so that it can be readily lifted from the molded pipe, as hereinafter more fully described.

Attached rigidly to the inner shell 13 are spaced brackets 24 and 25, in which is mounted a fixed vertical shaft provided with terminal studs 26 and 27, the latter being disposed substantially central of the inner shell, as shown. Rotatively connected by one end to these studs are rods 28 and 29, the opposite ends of which are pivotally connected, as by clips 30 and 31, to the inner shell near its inner lapping end 32.

Supported for rotation within the inner shell, preferably in the brackets 24 and 25, is a shaft 33, having jointed bars 34 35, connected rigidly by one end thereto and with other ends of the bars connected rotatively to the inner lapping end 32, preferably to the same clips 30 and 31 to which the rods 28 and 29 are coupled. The joints 36 and 37 of the bars 34 35 are formed with stops, one of which is shown at 38 in Fig. 4, which represents one of the bars disconnected and enlarged to limit the movement in one direction and to prevent the bars being moved beyond a direct line between the shaft 33 and clip members 30 31. The shaft 33 is provided with an operating-handle 39. By this means it will be obvious that when the shaft 33 is rotated in one direction the jointed bars 34 35 will be straightened out or positioned as in Figs. 2 and 3, with the effect of expanding the inner shell and pressing it closely against the inner face of the rim 11 and forming the inner wall of the mold as the outer shell forms the outer wall of the same. Then when the shaft 33 is rotated in the opposite direction the jointed bars will be "buckled" or folded together and contract the inner shell to loosen it and enable it to be withdrawn from the molded pipe.

Attached at suitable intervals to the outer shell 12 and spaced below its top are radially-disposed handles 40, and embracing the outer shell and supported upon these handle members is a flaring rim 41. Resting upon the upper end of the inner shell 13 is a funnel-shaped member 42, having a rim 43 depending within the inner shell and supporting the funnel-shaped member from lateral movement. These members 41 42, it will be obvious, form the means for guiding the material for forming the pipe into the mold. The material employed may be any of the compounds usually employed for sewer-pipes and for similar purposes, and the molds may be of any size or of any of the usual forms. After the shells 12 13 are clamped in position upon the base member 10 11 the members 41 42 are positioned thereon and the material fed into the mold and "tamped" therein with any of the usual implements, and after "setting" for the requisite time the members 41 42 are removed and the outer and inner shells loosened and removed, leaving the molded pipe standing upon the base 10 11, from whence it may be removed when sufficiently hardened, the upper edge of the molded pipe being smoothed off with a trowel or other implement before the shells 12 13 are removed.

The members 12 13 may be of any desired thickness; but in practice No. 14 light boiler or tank steel has generally been employed.

The length of time necessary for the molded pipe-sections to "set" depends upon the composition of which they are made, and in some forms the molds may be detached immediately after the tamping is completed, while with other compositions a longer time will be required.

The jointed bars which connect the inner lapping and outer lapping portions of the inner shell form, in effect, toggle-levers, and the means for moving these levers laterally, so as to expand or contract the inner shell, are mounted upon the fixed brackets, that are secured rigidly upon the inner wall of the inner shell. The brackets, the toggle-levers, and the rods connecting said toggle-levers to the brackets form stays or braces for said inner shell and prevent it from being crushed or forced out of shape when the material is being tamped into the mold.

I claim as my invention—

1. In a mold for manufacturing cement pipe, a split outer shell having overlapping terminals, means for expanding and contracting said shell, an inner shell spaced from the outer shell and also provided with overlapping terminals, brackets rigidly secured to the interior walls of the inner shell, studs carried by the brackets, rods forming a pivotal connection between said studs and the inner lapping end of the inner shell, jointed bars connecting the inner lapping and outer lapping portions of said inner shell, and means for moving said bars laterally to thereby cause the expansion and contraction of the inner shell.

2. In a mold for manufacturing cement pipe, a base provided with an annular stop-rib, a split outer shell seated on the base and having overlapping terminals, an inner shell spaced from the outer shell and also provided with overlapping terminals, brackets rigidly secured to the interior walls of the inner shell, studs carried by the brackets, rods forming a pivotal connection between said studs and the inner lapping end of the inner shell, jointed bars connecting the inner lapping and outer lapping portions of said inner shell, means for moving said bars laterally to thereby cause the expansion and contraction of said inner shell, a crank-shaft mounted for rotation on one terminal of the outer shell, a pivotal connection between said crank-shaft and the opposite terminal of the outer shell, and means for rotating said shaft to draw the outer shell into engagement with the stop-rib of said base.

3. In a mold for manufacturing cement pipe, a split outer shell having overlapping terminals, means for expanding and contracting said shell, an inner shell spaced from the outer shell and also provided with overlapping terminals, brackets rigidly secured to the interior walls of the inner shell, studs carried by said brackets, rods forming a pivotal connection between said studs and the inner lapping end of said inner shell, a shaft mounted for rotation upon the outer lapping portion of the inner shell, and jointed bars connecting said shaft and the inner lapping portion of said inner shell.

4. In a mold for manufacturing cement pipe, a split outer shell having overlapping terminals, means for expanding and contracting said shell, an inner shell spaced from the outer shell and also provided with overlapping terminals, brackets rigidly secured to the interior walls of the inner shell, studs carried by said brackets, rods forming a pivotal connection between the studs and the inner lapping end of the inner shell, a shaft mounted for rotation upon the outer lapping portion of the inner shell, jointed bars connecting said shaft and the interlapping portion of said inner shell, and each provided with a stop for limiting its movement in one direction, and means for rotating said shaft to thereby cause the jointed bars to expand and contract said inner shell.

5. In a mold for manufacturing cement pipe, a split outer shell having overlapping terminals, means for expanding and contracting said shell, an inner shell spaced from the outer shell and also provided with overlapping terminals, brackets rigidly secured to the interior walls of the inner shell, vertically-disposed studs carried by said brackets, rods forming a pivotal connection between said studs and the inner lapping end of the inner shell, a shaft mounted for rotation in said brackets, jointed bars connecting said studs and inner lapping portion of said inner shell, stops for limiting the outward movement of the jointed bars, and means for rotating said shaft.

6. In a mold for manufacturing cement pipe, the combination, with an outer shell of an inner shell spaced from the outer shell, and provided with overlapping terminals, brackets rigidly secured to the interior walls of the inner shell, said brackets being positioned in relation to the shell to serve as braces for the same, jointed bars arranged to expand and contract the lapping portion of said inner shell, and means mounted on said brackets for operating said bars.

7. In a mold for manufacturing cement pipe, the combination, with an outer shell of an inner shell spaced from the outer shell and provided with overlapping terminals, brackets rigidly secured to the interior walls of said inner shell, and positioned in relation thereto to serve as braces for the shell, and means mounted on said brackets for expanding or contracting said inner shell.

8. In a mold for manufacturing cement pipe, the combination, with an outer shell of an inner shell spaced from the outer shell, and provided with overlapping terminals, brackets rigidly secured to the interior walls of the inner shell near the top and bottom thereof, and positioned in relation thereto to serve as braces for the shell, and means mounted upon said brackets for simultaneously expanding or contracting both ends of said inner shell.

9. In a mold for manufacturing cement pipe, the combination, with an outer shell, of an inner shell spaced from the outer shell and provided with overlapping terminals, brackets rigidly secured to the interior walls of the inner shell and positioned in relation thereto to serve as braces for the shell, jointed bars connecting the inner lapping and outer lapping portions of said inner shell, and means for moving said bars laterally to thereby cause the expansion or contraction of the inner shell.

10. In a mold for manufacturing cement pipes, the combination with an outer shell, of an inner shell spaced from the outer shell and provided with overlapping terminals, brackets rigidly secured to the interior walls of the inner shell, jointed bars connected with the inner lapping and outer lapping portions of said inner shell, means for moving said bars laterally to cause the expansion or contraction of the inner shell, and movable rods connected with the shell and with a centrally-disposed support within the shell for bracing the shell, substantially as described.

In witness whereof I have hereunto set my hand this 19th day of April, 1906.

LEVI SHELL.

In presence of—
GUS JACKS,
A. W. McCALLUM.